(No Model.) 2 Sheets—Sheet 1.
S. S. KINGERY.
COFFEE ROASTER.
No. 328,949. Patented Oct. 27, 1885.
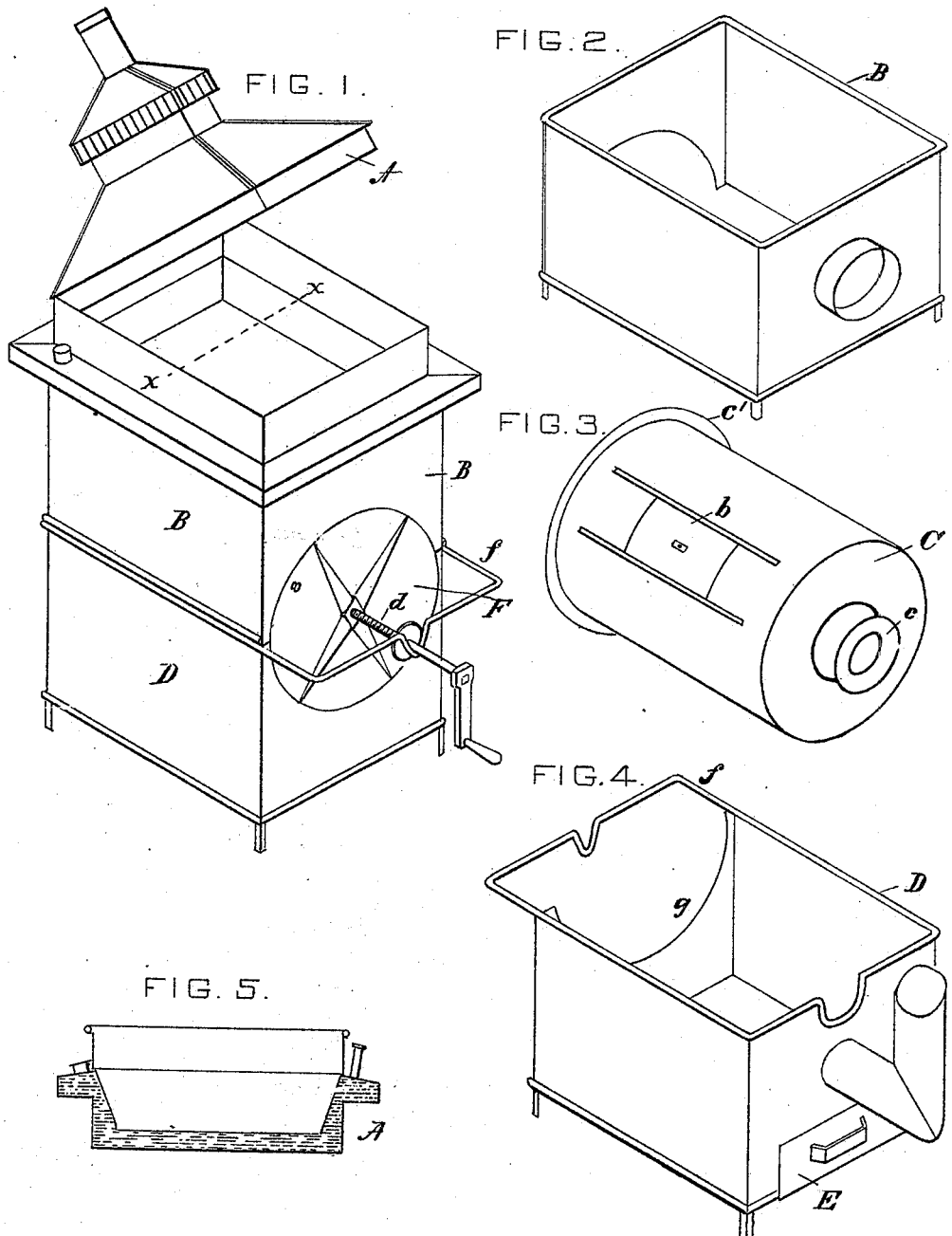
ATTEST.
S. H. Hageman
Jacob J. Rueckert
INVENTOR,
Samuel S. Kingery
per Jeptha Garrard
Atty (No Model.)  2 Sheets—Sheet 2.
S. S. KINGERY.
COFFEE ROASTER.
No. 328,949.  Patented Oct. 27, 1885.
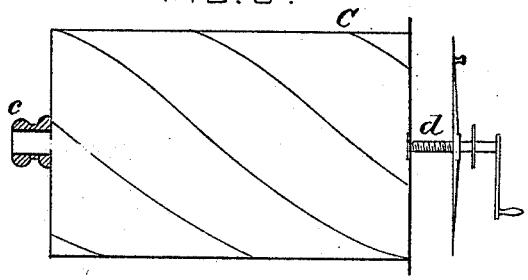
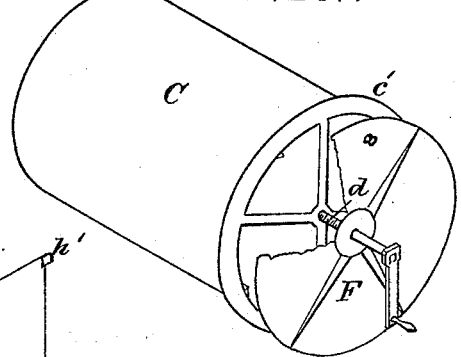
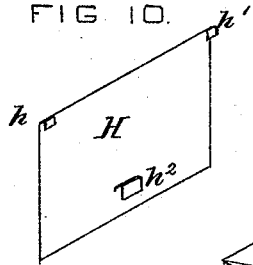
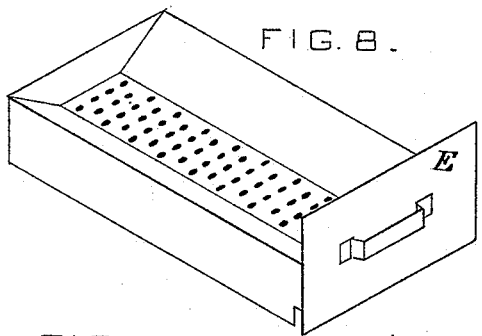
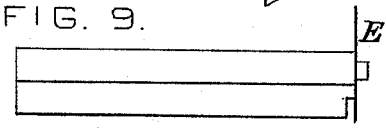
ATTEST,  INVENTOR,

UNITED STATES PATENT OFFICE.

SAMUEL SILVESTER KINGERY, OF CINCINNATI, OHIO.

COFFEE-ROASTER.

SPECIFICATION forming part of Letters Patent No. 328,949, dated October 27, 1885.

Application filed February 14, 1885. Serial No. 155,972. (No model.)

*To all whom it may concern:*

Be it known that I, SAMUEL SILVESTER KINGERY, of Cincinnati, Hamilton county, and State of Ohio, have invented a new and useful Improvement in Peanut and Coffee Roasters, of which the following is a full, clear, and exact description, reference being had to the accompanying drawings, forming part of this specification, in which—

Figure 1 is a perspective view of my combined peanut-roaster and heater. Fig. 2 is a perspective view of a frame intermediate to the heater and the cylinder-holding frame. Fig. 3 is a perspective view of the usual cylinder of a peanut-roaster. Fig. 4 is a perspective view of my cylinder and furnace box or frame. Fig. 5 is a vertical section through the heater at the line $x$ $x$, Fig. 1. Fig. 6 is a horizontal section through the center of Fig. 7. Fig. 7 is a perspective view of my roasting-cylinder, having the movable head broken away. Fig. 8 is a perspective view of my fire-grate and ash-box combined. Fig. 9 is a vertical section of fire-box, grate, and ash-pan through the center of Fig. 8. Fig. 10 is a perspective view of closing-slat.

Similar letters of reference in the several drawings indicate the same parts.

My invention relates to peanut and coffee roasters, and more especially to the roasting-cylinder thereof.

A peanut-roaster consists usually of a sheet-iron box adapted to serve as a holder for a furnace, and also to sustain a revolving roasting-cylinder. Such a box is shown in Figs. 1 and 4 as D. This box is not of my invention. The roasting-cylinder usually has its ends solid and firmly attached with projections serving as journals. The cylinder is furnished with a sliding door on one of its sides. This serves as an opening through which the cylinder may be filled with the nuts or coffee to be roasted. It serves also as an opening by which nuts may be from time to time taken out by the hand to ascertain the condition of the nuts or coffee. This cylinder is not of my invention. Sometimes one of the journals of this cylinder is enlarged and made hollow, so that some of the contents may be reached and withdrawn, without opening the door, to ascertain the condition of the nuts or coffee. Such a journal I use, and show in Fig. 3 at $c$; but it is not of my invention. Sometimes there is a removable part of one of the cylinder-heads, through which, when in its revolution it is on the lower or floor side of the cylinder, the contents may be withdrawn. These methods of removing the contents or testing them are in common use, are inconvenient and slow.

My invention consists, first, in making one head of the roasting-cylinder removable.

Reference being had to the accompanying drawings, Fig. 3, C is an ordinary roasting-cylinder having the usual door, $b$, on the side and the usual hollow journal, $c$, on one end, and furnished at the other end with a cast-iron flanged end, $c'$, having a hub at the center, and arms extending from said hub to the flange, as shown in Fig. 7. Into this hub the crank-shaft $d$ is rigidly fastened. This crank-shaft $d$ extends beyond the flanged open head $c'$, as shown in Figs. 6, 7, and 1, and is screw-threaded on the projecting part to within a short distance of the crank. It is sustained at its outer end by the journal-frame $f$, attached to the frame D. On this shaft I place a metal disk, F, adapted to run on said screw-thread, and of a diameter sufficient to let it constitute a complete closing-head for the cylinder when it is screwed up to the flange $c'$, and to permit of the delivery of the contents of the cylinder when it is screwed out on the shaft away from the flange. The flanged cylinder-head $c'$, the shaft $d$, screw-threaded, and the cylinder-head F, movable on said shaft, are of my invention.

My invention consists also, second, in making the fire-grate and ash-pan in one piece.

In all peanut-roasters that have come under my notice the fire-box supported by legs is set on the floor of the box D, and the bottom of the box is the ash-receiver, there being no other pan. To get the grate out for cleaning it, or to remove the ashes, the cylinder must be removed and the grate lifted out. Roasting cannot be carried on within doors in a roaster of this description on account of the smoke. It will be seen that with my fire-box a fire of charcoal may be started outdoors, and after the smoke has ceased to be produced the grate may be put in position in the roaster and the roasting proceed without inconvenience to the occupants of the room. There are many objections to the fire-box as ordinarily used in peanut-roasters, arising chiefly from the inconvenience and trouble in handling the parts while hot. My improved grate and ash-pan, made in one piece and readily removable, obviate these objections.

Reference being had to the accompanying drawings, Figs. 4, 8, and 9, E is my fire-box and ash-pan combined.

My invention relates also, third, to the heaters of peanut-roasters as adapted to be kept warm by the same fire that heats the roasting-cylinder.

The heater shown in the accompanying drawings, in Figs. 1 and 5, as A, is of the usual construction, and is not of my invention. It is used to heat the warmer A by a fire of its own. Sometimes, however, the warmer is heated by the same fire that does the roasting. I do not know, however, of any peanut-roaster in which by the removal of the cylinder the warmer is brought nearer the fire. It will be seen by the drawings, Fig. 1, that I place the warmer or heater A over the roaster-frame D, by means of an intermediate box or frame, B, while the roasting is going on. The warmer A may be brought down near the fire by removing the roasting-cylinder and the box B and placing the warmer A directly upon the frame D. In case the cylinder is removed, then a piece of sheet metal, H, Fig. 10, having the attaching-hooks $h$, $h'$, and $h^2$, is hung across the half-circle opening left in one end of the frame D by the removal of the cylinder. I effect a saving of fuel by thus bringing the warmer near the fire.

I am aware that it is not broadly new to construct the cylinder of a coffee-roasting machine with a removable end, and do not therefore claim such as my invention.

I claim as new—

1. In a nut-roaster, the combination, with the furnace box or frame D and the warmer A, of the removable interposed box or frame B, adapted when in place to inclose the upper part of the roasting-cylinder and support the warmer above it, as set forth.

2. The combination, with the roasting-cylinder C, having a removable end piece, of the furnace-box D, the box B, resting thereon, and the warmer A, resting upon said box B, said boxes being cut away for the passage of one end of the cylinder, substantially as set forth.

3. In a peanut-roaster, the combination of the frame D, the journal-bearing bracket $f$, attached to frame D, the open cylinder-head $c'$, the screw-threaded crank-shaft $d$, firmly attached to the hub of the cylinder-head $c'$ and sustained by the frame $f$, substantially as described.

4. The combination, with the furnace-box D, having the cut-away portion $g$, and the warmer A, of the interposed box B, having a cut-away portion corresponding to that of the box D, for use when roasting, and the plate H, for covering the cut-away portion $g$ when the box B is removed, as set forth.

5. In a cylinder of a peanut-roaster, the combination of the cylinder C, the flanged cylinder-head $c'$, the screw-threaded shaft $d$, firmly attached to the center of the cylinder-head $c'$, and the cylinder-head F, movably adjustable on said shaft, substantially as described.

6. The combination, with the cylinder C, its journals, and the furnace-box D, having bearings for the said journals, of the removable frame or box B, and the warmer A, adapted to rest upon the top of either of the boxes D or B, substantially as set forth.

The foregoing specification of my invention signed by me this 10th day of February, A. D. 1885.

SAMUEL SILVESTER KINGERY.

Witnesses:
ALFRED L. ROLLWAGEN,
JEPTHA GARRARD.